Sept. 29, 1942.　　　　L. NEUMANN　　　　2,297,240
LIQUID LENS PARTICULARLY FOR MOTOR CARS
Filed April 27, 1939
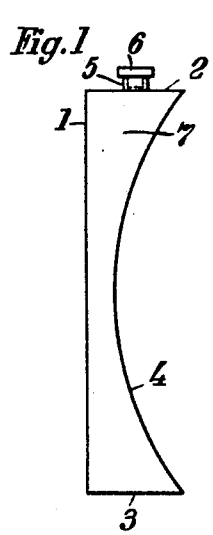
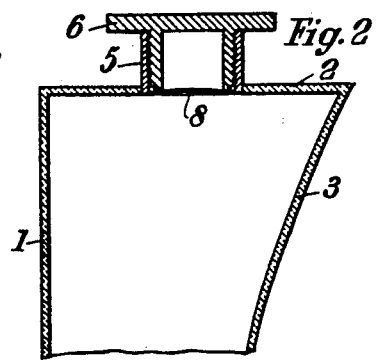
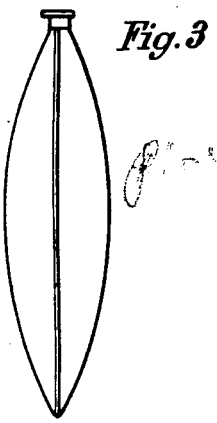
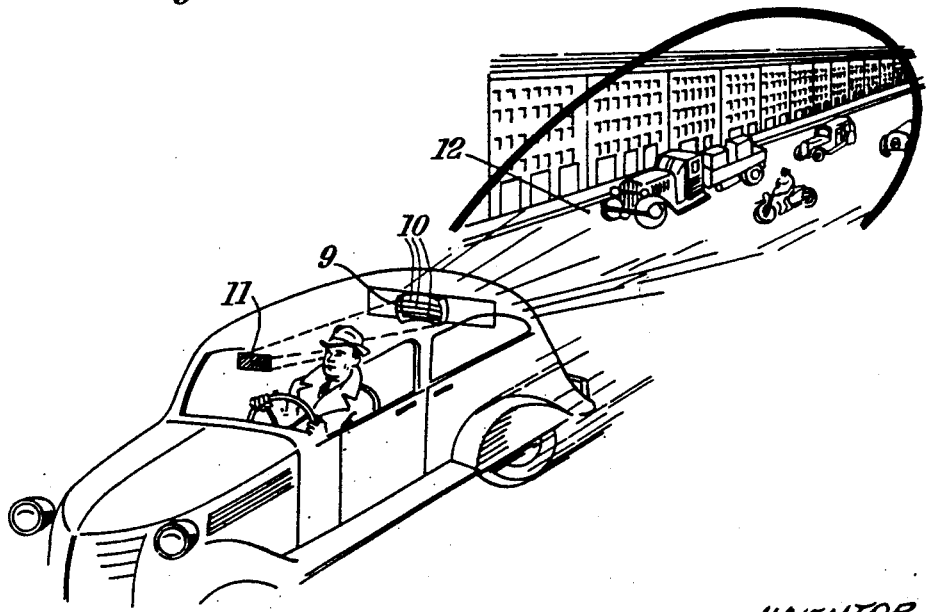
INVENTOR
Leo Neumann Patented Sept. 29, 1942

2,297,240

UNITED STATES PATENT OFFICE 2,297,240

LIQUID LENS, PARTICULARLY FOR MOTOR CARS

Leo Neumann, Berlin-Charlottenburg, Germany; vested in the Alien Property Custodian Application April 27, 1939, Serial No. 270,431
In Germany April 29, 1938

6 Claims. (Cl. 88—57)

This invention relates to liquid lenses of large dimensions such as may be used for motor cars. To improve the orientation towards the rear a dispersing lens has already been provided in the rear window of motor cars, an arrangement which is in point of fact adapted considerably to increase the field of vision towards the rear.

Attempts to introduce dispensing lenses of this nature have, however, all been unsuccessful up to now. Lenses were provided for this purpose such as are well known per se in the optical art, viz., massive lenses, which could not be introduced owing to the difficulty associated with their production, which is increased to unlimited extent with increasing dimensions, owing to their weight and the consequent dangers of and risk involved to traffic or the occupants of the car, and owing to the comparatively high price.

According to the invention there is adopted a new method of providing large-surface lenses, such as are required, for example, for the stated purpose.

The idea according to the invention is to be regarded in the fact that for the liquid lens a container is produced from spherically curved plates, which in turn consist of a transparent synthetic resin having a weight which is specifically lower than that of silicate glass and are so connected together that they form a unitary structure.

In this way there is obtained in point of fact the possibility of providing large lenses such as could not be produced heretofore from present-day transparent synthetic resins, i. e., from an artificial glass, such as Plexiglass, Trolitul and Mipolan.

Artificial glasses of this nature permit of the production of shaped bodies by extrusion only up to a maximum weight of 100 grammes.

If there is contemplated the production of massive lenses in the manner hitherto usual, these are naturally only of small dimensions and cannot be employed for the purpose of the invention if only for this reason alone. By the measure according to the invention it is possible, as careful investigations have shown, to produce exactly with consideration to the difficulties previously existing in the extrusion process large-surface lenses from artificial glasses, i. e., transparent synthetic substances.

A container for the liquid lens of unitary structure is obtained in such a manner that in the first place there are produced from the artificial glass thin plates and these latter are provided in a pressing operation, preferably in hot moulds, with the form which is required for the desired biconvex lens, biconcave lens, concavo-convex lens, plano-concave lens, plano-convex lens and lens assemblies.

The lens container according to the invention consisting of a high-quality and at the same time cheap material of low weight enables large lenses to be produced, which are extremely light, unbreakable and cheap to manufacture.

This is particularly the case if in accordance with an additional development of the idea according to the invention the liquid filling is also so selected that the same, without detriment to its optical characteristics, with respect to which a refraction index is necessary which corresponds to that of the optical glass, is light and cheap. In addition there is the fact that it does not vary its physical condition at the temperature occurring.

This is accomplished according to the invention by the fact that the container is provided with a filling which has a lower freezing point than water.

For this purpose it is possible either to furnish water with additional substances, such as glycerine, alcohol or suitable salts, which set down its freezing point, or to employ liquids complying with these requirements, such as polyvalent alcohols (glycerine), alcohol or oils.

The invention is in no way exhausted in the idea of employing liquid lenses for fitting in motor vehicles as dispersing lenses, there being rather more produced according to the invention a lens which is admirably suited for this particular purpose.

This is accomplished primarily by the fact that the container possesses a filling socket, which in turn is closed by a hollow threaded plug furnished with a diaphragm, which plug acts as pressure-compensating means for the expansion stresses of the filling liquid or of the container.

In this manner it is in particular rendered possible to fill out the entire inner space of the container with the liquid, so that air bubbles are unable to result at all, whilst at the same time avoiding excessive tensions of any kind, such as might result from heat-dependency of the material with respect to the container and the liquid.

The threaded plug employed according to the invention for closing the filling socket can be used not only for filling in the liquid and for replacing the same, but also as a form of safety valve. It may also be utilised for attachment of the lens, for example by the provision of an eye or the like for suspension of the lens.

The efficiency of the idea according to the invention is disclosed by the fact that the container can also be furnished with a filling, which is introduced in the liquid condition and is afterwards caused to solidify by evaporation, cooling or the like. In this manner there is obtained a "liquid lens" of a novel kind.

Particular advantages are offered by this liquid lens with solidified filling if there are employed for container and filling substances which from a thermal aspect behave in the same or a similar fashion, for example for the container an artificial glass, such as "Plexiglass," and for the filling "Plexigum," which is placed on the market by Messrs. Roehm & Hass A.-G., Darmstadt.

Dissolved clear gelatine or corresponding gums are suitable as filling. After the filling in of the solution the solidification can be brought about by expelling the solvent or by cooling the entire container.

A particular advantage of this solidified liquid lens is to be regarded in the fact that it is now possible to employ also ordinary thin glass, as the liquid upon the solidification forms a unitary body with the envelope.

The lens according to the invention is suitable in all cases in which it is a matter of low weight, safety against breakage and cheapness.

The lens according to the invention can also be designed as a means for measuring distance. It has been found that upon its use a vehicle approaching from the rear gradually enters from the top the field of vision of the rear-view mirror provided on the front of the car. The nearer the vehicle approaches from behind the greater is the extent to which the virtual image of the approaching vehicle passes in the mirror from the top to the bottom, so that the position of the vehicle in the mirror represents an exact indication of its distance away. According to the invention, the liquid lens is furnished with a number of superimposed marks or horizontal lines graduated in accordance with the particular vehicle and indicating the distance in metres, feet or the like. To facilitate the graduation sliding or otherwise shiftable markings can be employed.

The invention will now be described with reference to the drawing in conjunction with certain possible embodiments.

Fig. 1 shows the cross-section of a plano-concave lens with container walls 1, 2, 3 and 4, the filling socket 5, the threaded plug 6 and the filling 7.

In Fig. 2 there is shown on enlarged scale the socket 5 and the threaded plug 6, the cylindrical threaded portion of which produce the compensation in tension together with the diaphragm 8 attached to the inner edge of said plug.

The container in Fig. 1 can be so produced in an extrusion or pressing operation that the surfaces 1, 2 and 3 or 2, 3 and 4 are formed as an open container, and thereupon the spherically curved plate 4 or the flat plate 1 is firmly applied by adhesion, cementing or welding, so that a closed body of unitary structure is produced. In this connection the filling socket 5 can be simultaneously produced by extrusion or pressed in or applied in other suitable fashion.

Fig. 3 shows the lens according to the invention in the form of a biconvex lens, such as can be employed as collecting or condensing lens, for example for cinematographic purposes.

Fig. 4 shows the manner according to which my lens may be used as a means for measuring distance.

In this figure 9 is the rear window of the motor car furnished with my lens. This lens has horizontal lines 10. Further 11 is the rear mirror mounted in usual manner ahead the driver.

The lens mounted in the rear window of the motor car makes visible in the rear mirror 11 not only the motor vehicle 12 approaching from the rear, but also the lines 10. The position of the picture of the motor vehicle 12 against these lines 10 is a measure for the distance of the vehicle 12.

Having now described the invention, what I claim as new and desire to secure by Letters Patent of the United States is:

1. A lens comprising a transparent container; a transparent liquid filling the container; a filling socket communicating with the interior of the containers; a plug removably held in said socket; and a yieldable member, at all times more yieldable than the walls of the lens carried by said plug in yieldable contact with the liquid, to allow the liquid to expand without deforming the lens surfaces.

2. A lens comprising a transparent container; a transparent liquid filling the container; a socket communicating with the interior of the container; a plug removably held in said socket, and a yieldable diaphragm carried by the plug in yieldable contact with the liquid to allow the liquid to expand; said diaphragm being carried by the plug in position to be automatically removed and restored when the plug is removed from the socket and restored.

3. A lens comprising a transparent container; a transparent liquid filling the container; a filling socket communicating with the interior of the container; a hollow plug held in said socket having a closed outer end and a wide, open inner end surrounded by an exterior rabbet groove; and a yieldable diaphragm across said open inner end in yieldable contact with the liquid to allow the liquid to expand, and provided with an edge flange engaged in said groove and embracing the end of the plug to hold the diaphragm in place when in use and to automatically remove and restore the diaphragm with the plug when the plug is removed from the socket and restored.

4. A lens comprising a transparent container; a transparent liquid filling the container; a filling socket communicating with the interior of the container; a removable closure means releasably held in said socket; and a yieldable member secured across said socket in yieldable contact with the liquid; said member being more yieldable than the lens walls and carried by the closure means when the latter is removed from the socket and restored.

5. A lens comprising a transparent container; a transparent liquid filling the container; a filling socket communicating with the interior of the container; a hollow plug held in said socket having an open inner end; and a yieldable diaphragm secured across said open inner end in yieldable contact with the liquid; the diaphragm being carried by the plug when the plug is removed from the socket and restored.

6. A lens comprising a transparent container; a transparent liquid filling the container; a socket communicating with the interior of the container; a plug removably held fast in said socket; and a yieldable diaphragm carried by the plug and yieldable relative to the plug and in yieldable contact with the liquid to allow the liquid to expand; said diaphragm being carried by the plug in position to be automatically removed and restored when the plug is removed from the socket and restored.

LEO NEUMANN.